Dec. 30, 1930.  A. E. FREEMAN  1,786,565

THRUST BEARING

Filed Oct. 18, 1927

INVENTOR.
A. E. Freeman
BY
ATTORNEY

Patented Dec. 30, 1930

1,786,565

UNITED STATES PATENT OFFICE

ALBERT E. FREEMAN, OF EAST ORANGE, NEW JERSEY, ASSIGNOR TO AMERICAN TELEPHONE AND TELEGRAPH COMPANY, A CORPORATION OF NEW YORK

THRUST BEARING

Application filed October 18, 1927. Serial No. 226,906.

This invention relates to thrust bearings, and more particularly to bearings of the self-lubricating type.

The pressures and speeds to which certain machinery is subjected causes the rapid wear of the thrust bearings or thrust washers which are used in connection with the shafts of such machinery. This wear results in the cutting, distortion and other deterioration of the bearings or thrust washers, and requires replacement thereof at frequent intervals.

It is an object of the present invention to provide a self-lubricating arrangement for thrust bearings, thrust washers, and the like, so that they obtain a maximum and positive supply of lubrication throughout their contacting surfaces a given number of times per revolution.

Figure 1:
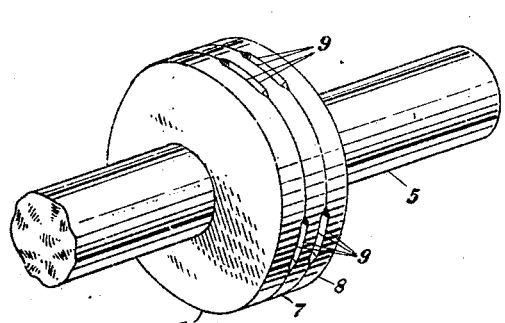
Figure 2:
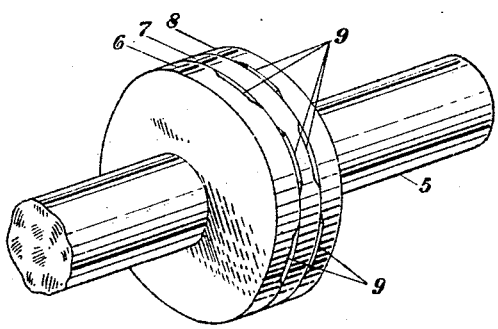
Figure 3:
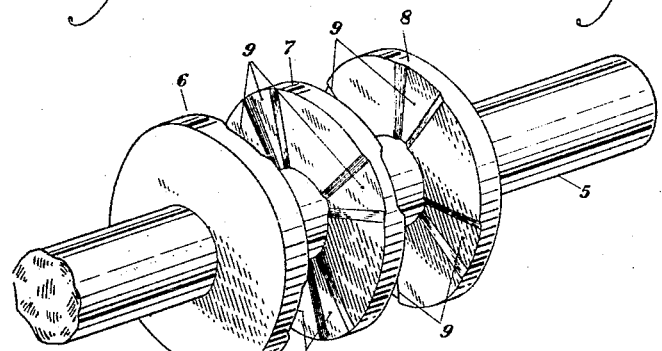
Figure 4:
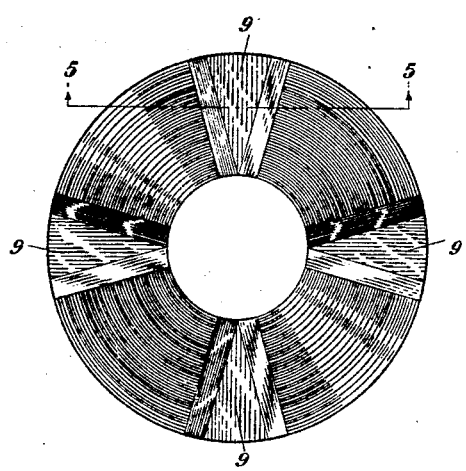
Figure 5:
Figure 6:
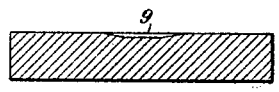

Referring to the drawing, in which like characters of reference designate like parts throughout, Figure 1 is a perspective view of a shaft provided with a series of disk-like members associated therewith, and having grooves in mated position; Fig. 2 is a similar view showing the grooves of the disk-like members in unmated position; Fig. 3 shows the disk-like members in separated relation on the shaft; Fig. 4 illustrates a side elevation of one of the disk-like members; Fig. 5 is an end view taken on the line 5—5 of Fig. 4 showing grooves on both sides of the disk-like member, and Fig. 6 is a similar view of a disk-like member having grooves on only one side thereof.

The numeral 5 in the drawing designates an ordinary shaft which extends through central openings of a series of disk-like members 6, 7 and 8. Although said members are indicated, in the present instance, for the purpose of illustration, as being three in number and of certain form, it will be understood that the number may be increased or diminished as desired. The member 6 may if desired, be affixed to shaft 5. The member 6 may have grooves provided about its flat surface. The disk-like member 8 may be affixed to the housing or other element receiving a thrust; and these members may be composed of steel. The intermediate disk-like member may be loosely associated with the shaft and may be composed of bronze or like material. This latter member may have grooves on both of its flat surfaces, as shown in Fig. 5, or only on one surface, as indicated in Fig. 6. The grooves 9 in the several disk-like members are substantially V-shaped in plan view. The disk-like member 7, because of its loose association with the shaft, rotates at approximately half the speed of said shaft. The disk-like members are shown as being provided with four grooves 9 which are spaced at an equal distance from each other about the flat surfaces of the members. The grooves comprise beveled side portions with an intermediate depressed portion. The outer edges of the beveled portions lie in radial directions and said grooves extend from the peripheries of the members to the central openings through which the shaft 5 is placed. In practice, the number of grooves and the size of the depressions are governed by the severity of service in the way of pressure and speeds to which the disk-like members are to be subjected. The disks are adapted to be rotated in either direction by providing a beveled edge at both sides of the depressions. Thus the beveled edges on one side of the grooves cause a wedging action of the lubricant during the rotation of the shaft and disk-like members in a clockwise direction, and the beveled edges on the opposite sides of the grooves cause said wedging action during the contra-clockwise rotation of said shafts and disk-like members. The beveled portion causing the wedge-like action being in the rear of the groove with relation to its direction of rotation.

The intermediate disk-like member 7, which is loosely associated with the shaft 5, which rotates at half the speed thereof, causes its grooves to periodically mate with like grooves on the contiguous members 6 and 8, so that a channel is formed by the mated grooves. As the shaft and its mounted components are positioned within a casing and immersed in oil in a customary manner, it will be apparent that when such channels are formed, the lubricant will enter them and be diffused over the flat contacting surfaces of the contiguous disks as they rotate with respect to each other. The beveled edges of the grooves cause a wedging action which forces the lubricant between the flat surfaces of the contiguous members. In this way any tendency of the lubricant being forced out is counter-acted by the wedging action which causes the lubricant to enter between the surfaces. The film of lubricant between the grooves of the contacting flat surfaces of the disks which may be squeezed out under heavy load conditions is reestablished upon the succeeding mating and formation of channels by the grooves of the contiguous disks.

What is claimed is:

1. The combination of a plurality of self-lubricating bearings comprising a series of contacting disk-like members having flat surfaces with coinciding central apertures provided for a shaft, a plurality of wedge-shaped grooves extending in spaced relation from each other on the flat surfaces of the disk-like members from their peripheries to their central apertures, said grooves comprising beveled side portions and an intermediate depressed portion, said disk-like members being mounted to rotate at relatively different speeds to permit the periodic mating of the grooves of said members with the grooves of contiguous members whereby lubricant enters channels formed by the mating of said grooves, thus reestablishing a new film of oil on the flat surfaces of the disk-like members upon each succeeding periodic mating of the two grooves, said new film being maintained by the wedging action of the lubricant on both sides of the contacting surfaces of the disk-like members which counteracts the tendency of displacement of the lubricant which might be caused by the pressure exerted on the contacting surfaces of the disk-like members.

2. A lubricating arrangement for bearings comprising a series of disk-like members provided with central apertures for a shaft and having flat surfaces, said shafts and disk-like members being adapted to rotate in a clockwise and contraclockwise direction, grooves of substantially V-shape having beveled edges with boundary lines extending in a radial direction and being provided on the flat surfaces and extending from the peripheries to the central apertures of said members certain of said disk-like members being loosely associated with and rotating at a lower speed than said shaft, the grooves in the loosely associated disk-like members periodically mating with the grooves of the contiguous disk-like members to form a channel for the entrance of a lubricant, said lubricant being diffused between the flat surfaces of the contiguous disk-like members during the interval between the periodic mating of said grooves, thus reestablishing a new film of oil on the flat surfaces of the disk-like members upon each succeeding periodic mating of the grooves, said new film being maintained by the wedging action of the lubricant on both sides of the contacting surfaces of the disk-like members.

In testimony whereof, I have signed my name to this specification this 14th day of October, 1927.

ALBERT E. FREEMAN.